United States Patent

[11] 3,566,913

[72] Inventor Arthur C. Parthe, Jr.
 Peabody, Mass.
[21] Appl. No. 775,869
[22] Filed Nov. 14, 1968
[45] Patented Mar. 2, 1971
[73] Assignee the United States of America as represented by the Secretary of the Navy

[54] DIAPHRAGM VALVE
 3 Claims, 6 Drawing Figs.

[52] U.S. Cl. ............................................. 137/493,
 137/220, 137/494, 137/510
[51] Int. Cl. ........................................... F16k 17/18
[50] Field of Search .................................. 137/494,
 489, 496, 510, 525.5, 469; 251/45; 137/155, 183,
 219, 220, 221, 493; 251/61.1

[56] References Cited
UNITED STATES PATENTS

| | | | |
|---|---|---|---|
| 1,220,985 | 3/1917 | Harter | 251/61.1X |
| 2,715,418 | 8/1955 | Van Derbeck | 251/61.1X |
| 3,038,488 | 6/1962 | Welch et al. | 137/219 |
| 3,057,376 | 10/1962 | Agutter et al. | 251/61.1X |
| 623,934 | 4/1899 | Wilson et al. | 137/108UX |
| 1,884,810 | 10/1932 | Muller | 137/510 |
| 2,583,664 | 1/1952 | Oldham et al. | 137/469X |
| 2,877,791 | 3/1959 | Rich | 251/45X |

FOREIGN PATENTS

| | | | |
|---|---|---|---|
| 899,236 | 6/1962 | Great Britain | 251/61.1 |
| 931,540 | 2/1948 | France | 137/469 |
| 1,124,777 | 7/1960 | Germany | 137/220 |

*Primary Examiner*—M. Cary Nelson
*Assistant Examiner*—R. B. Rothman
*Attorneys*—R. I. Tompkins, L. I. Shrago and C. E. Vautrain, Jr.

ABSTRACT: An elastic diaphragm valve is provided which permits control of fluid flow by a small pressure gradient. The diaphragm is disposed opposite a pair of passages connecting two flow lines and is under selected pressure so that, when the pressure in each of the flow lines is equal to or greater than the selected pressure, flow will occur; and when the pressure in one of the flow lines is less than the selected pressure and in the other flow line is equal to the selected pressure, flow will be prevented.

PRESSURE SENSITIVE
FLOW CONTROLLER — 43

INVENTOR.
ARTHUR C. PARTHE, JR.

INVENTOR.
ARTHUR C. PARTHE, JR.

DIAPHRAGM VALVE

The invention described herein may be manufactured and used by or for the Government of the United States of America for governmental purposes without the payment of any royalties thereon or therefor.

This invention relates to diaphragm valves and, more particularly, to an elastic diaphragm valve for controlling fluid flow by means of a small pressure gradient.

It is always desirable in fluid flow control to provide control means which are simple in operation, simple in construction and relatively insensitive to shock and/or vibration, among other features. Existing flow control valves employ such structural members as a spring, a bellows or an electrical/mechanical control means. The spring valve is the least complex of the prior art valves but has an undesirably high sensitivity to shock and/or vibration. The bellows is more complicated, more costly and is more sensitive to shock and/or vibration. Electromechanical valves are very complicated, very high in cost, undesirably heavy and have a moderate to high sensitivity to shock and/or vibration. In addition, these valve types require components such as a needle, a gate, a globe or a plunger which introduce another source of complexity and therefore possible malfunction. The above three valve types also require precise calibration of the active elements; e.g., spring, bellows, etc. The prior art thus fails to provide a valve which combines the features of simplicity in both construction and operation with a relative insensitivity to shock and/or vibration. The present invention avoids the disadvantages of prior art valves by providing an elastic diaphragm valve which does not require precise manufacturing or precise critical adjustment, has a low sensitivity to shock and/or vibration and is operable by a low-pressure gradient.

The valve of the present invention basically comprises an enclosure which is disposed at the juncture of at least two flow lines, the enclosure having a sealed chamber at its remote end, a walled center portion whose top is the valve seat which is disposed substantially adjacent the sealed end and means for permitting flow between the two flow lines when selected pressure conditions exist. The flow-controlling, resilient diaphragm is spaced opposite the valve seat. Flow is interrupted under selected pressure conditions in the flow lines or the chamber by the diaphragm being displaced toward and contacting the valve seat.

Accordingly, it is an object of the present invention to provide a diaphragm valve which is inexpensive and yet does not require precise manufacturing or critical adjustments.

Another object of the invention is to provide a diaphragm valve which is simple in construction and operation yet has a low sensitivity to shock and/or vibration.

A further object of the invention is to provide a diaphragm valve which is relatively inexpensive, simple to manufacture and requires only a small pressure gradient to operate.

Other objects, advantages and novel features of the invention will become apparent from the following detailed description thereof when considered in conjunction with the accompanying drawings in which like numerals represent like parts throughout and wherein.

Figure 1:
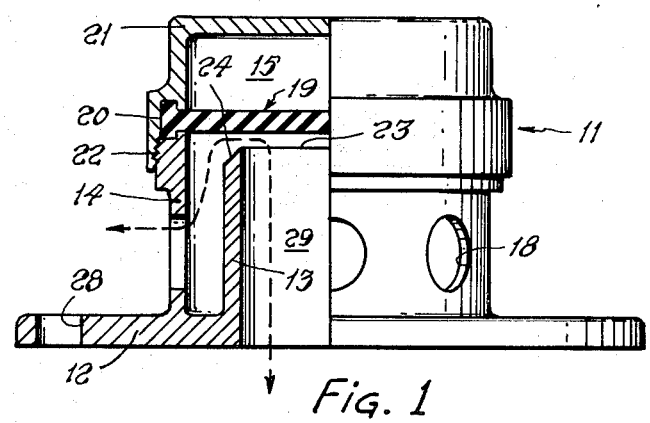
FIG. 1 is a side elevation partly cut away of one embodiment of the invention.

Referring to FIG. 1, the invention is shown embodied in an enclosure 11 which includes a base 12, passage defining walls 13 and 14 and a sealed gas chamber 15. Outer wall 14 is provided with access means such as ports 18 to accommodate flow of fluid to and from an external source and is sealed at its remote end by a resilient diaphragm 19 which may be secured in place by an end ring 20. A detachable head such as cap 21 may be employed to form chamber 15 and may be secured to wall 14 by conventional means such as threads 22. Base 12 may vary in size depending upon the fittings, not shown, to which it is attached and may be provided with bolt holes 28 for securing to such fittings as conduits, flanges, etc.

Wall 13 may have the form of a collar as shown and is terminated at a selected distance from diaphragm 19 such that the diaphragm may contact the end of the collar under certain pressure conditions. The end of wall or collar 13 thus becomes a valve seat 23 which is formed, for example, in the present embodiment by tapering the outer edge of the collar as indicated at 24. Flow via one flow line is effected through the interior of the collar, forming a passage 29, over the valve seat 23 and through ports 18 to the second or other flow line.

In FIGS. 2 through 5, schematic drawings of the valve diaphragm and valve body are presented illustrating valve action under various pressure conditions. The valve assembly in these views is seated on a flange 34 within one of the flow lines, being secured to the flange by conventional means such as by weld 35. Flow lines 41 and 42 are connected by the valve assembly.

Figure 6:
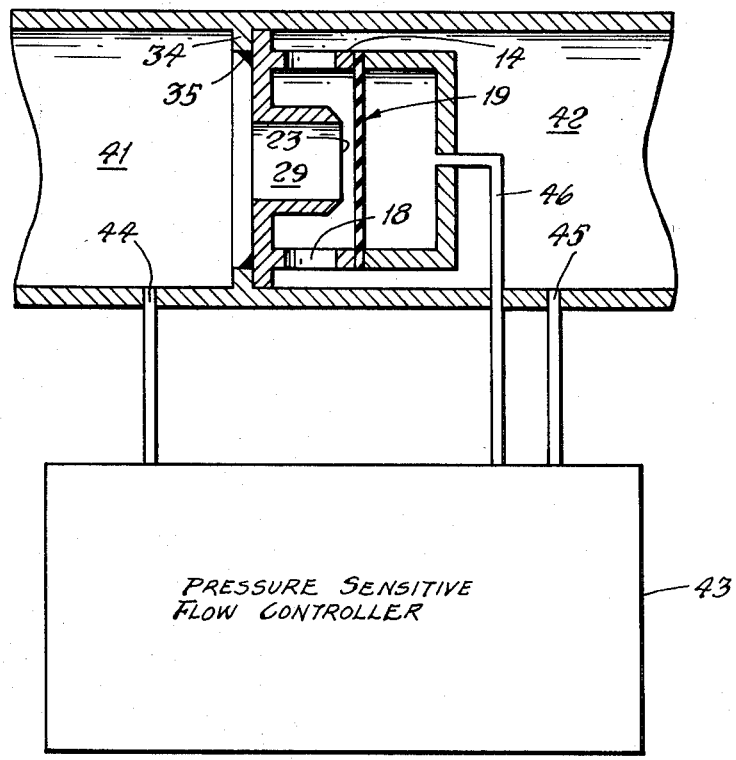
FIG. 6 is a sectional view of an alternate embodiment of the invention.

In FIG. 6 an alternate embodiment of the device is illustrated wherein the components are similar to those in FIGS. 2 through 5 with the exception that the sealed chamber 15 is connected to a pressure source so that the pressure in chamber 15 may be varied during flow control operations. Also included in FIG. 6 is a pressure-sensitive flow control 43 which senses the control in flow lines 41 and 42 by means of conduits 44 and 45. Pressure in chamber 15 is varied through conduit 46.

Figure 2:
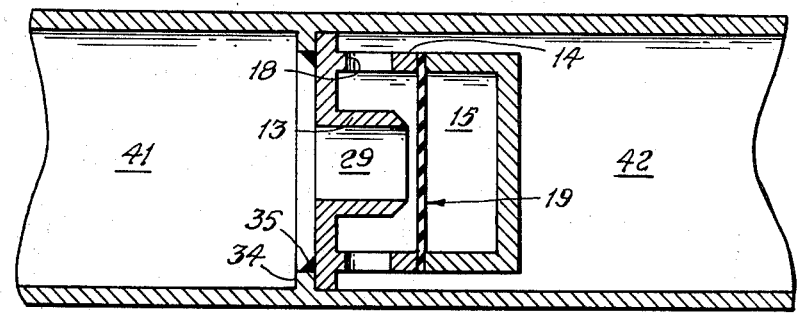
FIG. 2 is a schematic diagram in section of the invention under conditions of equal pressure.
Figure 3:
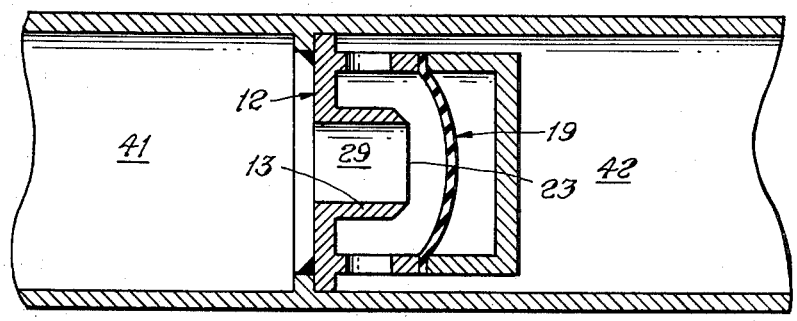
FIG. 3 is a schematic diagram of the invention in section under selected differential pressure in the flow lines.
Figure 4:
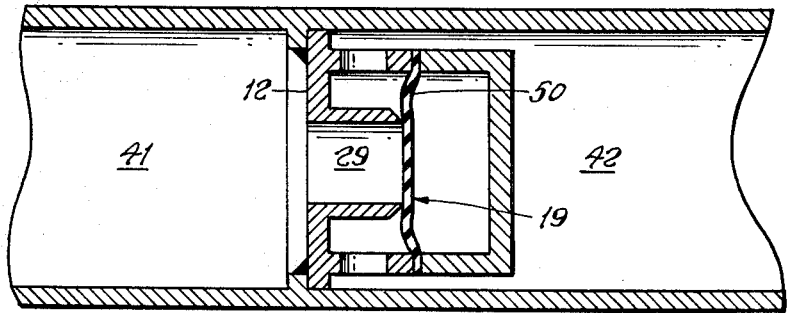
FIG. 4 is a schematic diagram of the invention in section wherein differential pressure conditions prevent flow.
Figure 5:
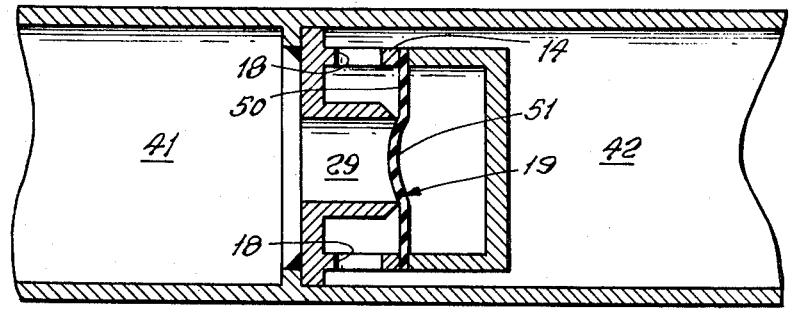
FIG. 5 is a schematic diagram of the invention in section wherein further differential pressure conditions prevent flow.

The operation of the device will be explained in connection with the schematic diagrams in FIGS. 2 through 5. In FIG. 2, a condition of equal pressure in flow line 41, flow line 42 and gas chamber 15 produces a disposition of diaphragm 19 in the position shown. In FIG. 3, the pressure in flow lines 41 and 42 exceeds the pressure in gas chamber 15, permitting flow between the flow lines without the impedance of diaphragm 19. With flow pressure exceeding the gas chamber pressure, diaphragm 19 is bowed inwardly into chamber 15 thereby permitting a greater area for the interchange of fluid between flow lines. The high pressure causes diaphragm 15 to become dome-shaped in a circular enclosure so that fluid flow passage is uniform around the periphery of valve seat 23. In FIG. 4, pressure conditions exist which cause the valve to be closed by diaphragm 15 being seated against valve seat 23. To produce the condition of FIG. 4, the pressure in gas chamber 15 exceeds the pressure in flow line 42 thereby causing a curvature as indicated at 50 in diaphragm 19. The pressure in gas chamber 15 in FIG. 4 is equal to the pressure in flow line 41 as indicated by the flat condition of diaphragm 15 across valve seat 23. FIG. 5 illustrates another condition under which flow is prevented. Here the pressure in flow line 42 is equal to the pressure in gas chamber 15 as indicated by the flat condition of diaphragm 19 at 50 while the pressure in flow line 41 is less than the pressure in gas chamber 15 as indicated by the dome-shaped condition of diaphragm 19 and 51 within the periphery of valve seat 23.

Diaphragm 19 is operable under small pressure differences between flow lines 41 and 42 and gas chamber 15. It has been observed that an initial gas chamber pressure of 15 p.s.i.a will cause the valve to close as shown in FIG. 4 where a pressure of 13 p.s.i.a. exists in flow line 42. The pressure observed in flow line 41 was 14 p.s.i.a. At low pressures this may not be unusual, but through the present invention the same differential will also control flow at much higher pressures. The present invention may be used in a wide variety of flow control situations, one example being to maintain a minimum pressure, i.e., 14.5 p.s.i.a., within an inertial guidance system case regardless of how the external pressure varies. The magnitude of external pressure varies over a wide range and at high rates of change, i.e., p.s.i./sec., while the valve allows only a small pressure gradient to develop across the case boundary to ambient pressure. That is, the diaphragm has virtually complete freedom of movement and thus may respond substantially instantaneously to changes in pressure in either of the flow lines thereby preventing a large and possible damaging pressure gradient to occur.

The simple elastic diaphragm in the invention may be made of a variety of resilient materials compatible with the fluid in the flow lines. The valve seat preferably is circular. Since the diaphragm is the only moving part, replacement is inexpensive. Manufacturing tolerances for the valve are not critical thus permitting low production cost. The exact pressure gradient required to seal the diaphragm against the valve seat is controlled by the initial spacing between this seat and the neutral or flat position of the diaphragm and also the resiliency of the diaphragm material, e.g., a small gap and very flexible material allows for a low closing gradient. Further, varying the percentage of total diaphragm surface area in contact with the valve seat, by changing diaphragm and/or valve seat diameters, will modify valve fluid flow characteristics and performance near the closing/opening pressure.

I claim:

1. A valve for controlling the flow of fluids by a low pressure gradient comprising:

at least two fluid flow lines and a valve body contained within said flow lines and surrounded by flow fluid;

said valve body interconnecting said lines and having an interior passage communicating with one of said flow lines and an exterior passage communicating with the other of said flow lines;

said interior passage defined by a wall member having an end which forms a valve seat;

said valve body including a sealed chamber disposed opposite said valve seat;

said chamber formed on one side by a resilient diaphragm; said diaphragm spaced from and parallel to the plane of said valve seat and extending across both of said passages; and a gas under selected constant pressure in said chamber for selectively positioning said diaphragm, whereby flow between said two lines may occur under appropriate pressure differential when the pressure in each of said lines is equal to or greater than said selected pressure and said flow will be prevented when the pressure in one of said lines is less than said selected pressure and in the other line is not greater than said selected pressure.

2. The device as defined in claim 1 wherein said valve body includes a base and an enclosure secured thereto;

said diaphragm disposed in said enclosure so as to to form said sealed chamber in the portion of the enclosure remote from said base; and a collar defining said interior passage and extending from said base to a position adjacent said diaphragm, the remote end of said collar forming said valve seat.

3. A device for controlling fluid flow by a small pressure gradient comprising:

a valve body contained within and adapted to permit flow of fluid between at least two interconnected flow lines, said valve body including a plenum portion where flow interchange occurs and a pressurized portion where a selected control pressure is maintained;

a diaphragm in said valve body adapted to prevent flow between said flow lines under selected conditions;

said plenum portion formed by an inner collar, the wall of said valve body and said diaphragm;

the end of said collar forming a valve seat and said diaphragm spaced a selected distance from and parallel to the plane of said valve seat;

said diaphragm seating against said valve seat under selected pressure conditions in said flow lines and in said pressurized portion; and pressure control means and means connecting said pressure control means to said pressurized portion, whereby selection of pressure in said pressurized portion may prevent flow or permit flow between said flow lines under an appropriate pressure differential.